(12) United States Patent
Cho et al.

(10) Patent No.: US 9,618,090 B2
(45) Date of Patent: Apr. 11, 2017

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Jl, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 8 days.

(21) Appl. No.: 14/878,531

(22) Filed: Oct. 8, 2015

(65) Prior Publication Data

US 2016/0169343 A1    Jun. 16, 2016

(30) Foreign Application Priority Data

Dec. 11, 2014    (KR) ........................ 10-2014-0178384

(51) Int. Cl.
*F16H 3/62* (2006.01)
*F16H 3/44* (2006.01)
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2046* (2013.01)

(58) Field of Classification Search
CPC ................ F16H 2200/2012; F16H 2200/2046
See application file for complete search history.

(56) References Cited

U.S. PATENT DOCUMENTS

| 2012/0172173 | A1 | 7/2012 | Wittkopp et al. |
| 2013/0090206 | A1 | 4/2013 | Mellet et al. |
| 2016/0025190 | A1* | 1/2016 | Ogauchi ................. F16H 3/666 475/204 |

FOREIGN PATENT DOCUMENTS

| JP | 2009-197927 A | 9/2009 |
| KR | 10-2014-0046240 A | 4/2014 |

* cited by examiner

*Primary Examiner* — Tisha Lewis
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque, a first planetary gear set, a second planetary gear set, a third planetary gear set, a fourth planetary gear set, a first rotation shaft selectively connected to a transmission housing, a second rotation shaft, a third rotation shaft selectively connected to the transmission housing, a fourth rotation shaft, a fifth rotation shaft directly connected to the input shaft, a sixth rotation shaft selectively connected to the fourth rotation shaft or the fifth rotation shaft, a seventh rotation shaft selectively connected to the fourth rotation shaft, and an eighth rotation shaft directly connected to the output shaft, and selectively connected to the seventh rotation shaft.

10 Claims, 2 Drawing Sheets

FIG. 2

| | C1 | C2 | C3 | C4 | B1 | B2 | Gear ratio |
|---|---|---|---|---|---|---|---|
| 1ST | | | O | O | | O | 2.518 |
| 2ND | | O | O | | | O | 2.140 |
| 3RD | | O | | O | | O | 1.900 |
| 4TH | O | O | | | | O | 1.600 |
| 5TH | O | | | O | | O | 1.347 |
| 6TH | O | O | | O | | | 1.000 |
| 7TH | O | | | O | O | | 0.686 |
| 8TH | O | O | | | O | | 0.600 |
| 9TH | | O | | O | O | | 0.400 |
| 10TH | | O | O | | O | | 0.240 |
| 11TH | | | O | O | O | | 0.218 |
| REV | | | | O | O | O | 1.600 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2014-0178384 filed Dec. 11, 2014, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle which improves power delivery performance and reduces fuel consumption by achieving eleven forward speed stages using a minimum number of constituent elements.

Description of the Related Art

In recent years, a rise in oil price causes a rise in competition for technologies to enhance fuel efficiency.

As a result, research into reduction of weight and enhancement of fuel efficiency through down-sizing is being conducted in the case of an engine and research for simultaneously securing operability and fuel efficiency competitiveness through multi-stages is being conducted in the case of an automatic transmission.

However, in the automatic transmission, as the number of speed stages increase, the number of internal components increase, and as a result, mountability, transmission efficiency, and the like may still deteriorate and cost, and weight may increase.

Accordingly, development of a planetary gear train which may bring about maximum efficiency with as small a number of components may be important in order to increase a fuel efficiency enhancement effect through the multi-stages.

In this aspect, in recent years, 8 and 9-speed automatic transmissions tend to be implemented and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving eleven forward speed stages and one reverse speed stage using minimum number of constituent elements and of improving silent driving using a driving point positioned at a low engine speed.

According to various aspects of the present invention, a planetary gear train of an automatic transmission for a vehicle may include an input shaft receiving torque of an engine, an output shaft outputting changed torque, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first rotation shaft including the first sun gear, the second ring gear, and the third sun gear, and selectively connected to a transmission housing, a second rotation shaft including the first planet carrier, the third ring gear, and the fourth planet carrier, a third rotation shaft including the first ring gear and selectively connected to the transmission housing, a fourth rotation shaft including the second sun gear, a fifth rotation shaft including the second planet carrier and directly connected to the input shaft, a sixth rotation shaft including the third planet carrier and selectively connected to the fourth rotation shaft or the fifth rotation shaft, a seventh rotation shaft including the fourth sun gear and selectively connected to the fourth rotation shaft, and an eighth rotation shaft including the fourth ring gear, directly connected to the output shaft, and selectively connected to the seventh rotation shaft.

Each of the first, second, third, and fourth planetary gear sets may include a single pinion planetary gear set.

The first, second, third, and fourth planetary gear sets may be disposed sequentially from an engine side.

The planetary gear train may further include a first clutch interposed between the fifth rotation shaft and the sixth rotation shaft, a second clutch interposed between the seventh rotation shaft and the eighth rotation shaft, a third clutch interposed between the fourth rotation shaft and the sixth rotation shaft, a fourth clutch interposed between the fourth rotation shaft and the seventh rotation shaft, a first brake interposed between the first rotation shaft and the transmission housing, and a second brake interposed between the third rotation shaft and the transmission housing.

A first forward speed stage may be achieved by operation of the third and fourth clutches and the second brake, a second forward speed stage may be achieved by operation of the second and third clutches and the second brake, a third forward speed stage may be achieved by operation of the second and fourth clutches and the second brake, a fourth forward speed stage may be achieved by operation of the first and second clutches and the second brake, a fifth forward speed stage may be achieved by operation of the first and fourth clutches and the second brake, a sixth forward speed stage may be achieved by operation of the first, second, and fourth clutches, a seventh forward speed stage may be achieved by operation of the first and fourth clutches and the first brake, an eighth forward speed stage may be achieved by operation of the first and second clutches and the first brake, a ninth forward speed stage may be achieved by operation of the second and fourth clutches and the first brake, a tenth forward speed stage may be achieved by operation of the second and third clutches and the first brake, an eleventh forward speed stage may be achieved by operation of the third and fourth clutches and the first brake, and a reverse speed stage may be achieved by operation of the fourth clutch and the first and second brakes.

According to various aspects of the present invention, a planetary gear train of an automatic transmission for a vehicle may include an input shaft receiving torque of an engine, an output shaft outputting changed torque, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear; and a fourth planetary gear set including a fourth sun gear, a fourth planet carrier, and a fourth ring gear, in which the input shaft may be directly connected to the second planet carrier, the output shaft may be directly connected to the fourth ring gear, the first sun gear may be directly connected to the second ring gear and the third sun gear, the first planet carrier, the third ring gear, and the fourth planet carrier are directly connected to each other, the second planet carrier may be selectively connected to the third planet carrier, the fourth sun gear may be selectively connected to the fourth ring gear, the second sun gear may be selectively connected to the third planet carrier, the second sun gear may be selectively connected to the fourth sun gear, the first sun gear may be selectively connected to a transmission housing, the first ring gear may be selectively connected to the transmission housing.

The planetary gear train may further include a first clutch connecting the second planet carrier with the third planet carrier, a second clutch connecting the fourth sun gear with the fourth ring gear, a third clutch connecting the second sun gear with the third planet carrier, a fourth clutch connecting the second sun gear with the fourth sun gear, a first brake connecting the first sun gear with the transmission housing, and a second brake connecting the first ring gear with the transmission housing.

Various embodiments of the present invention may achieve eleven forward speed stages by combining four planetary gear sets with six friction elements. Therefore, power delivery performance and fuel economy may be improved.

Since a speed stage suitable to engine speed can be achieved due to multiple speed stages, silent driving may be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed in the exemplary planetary gear train according to the present invention.

Figure 1:
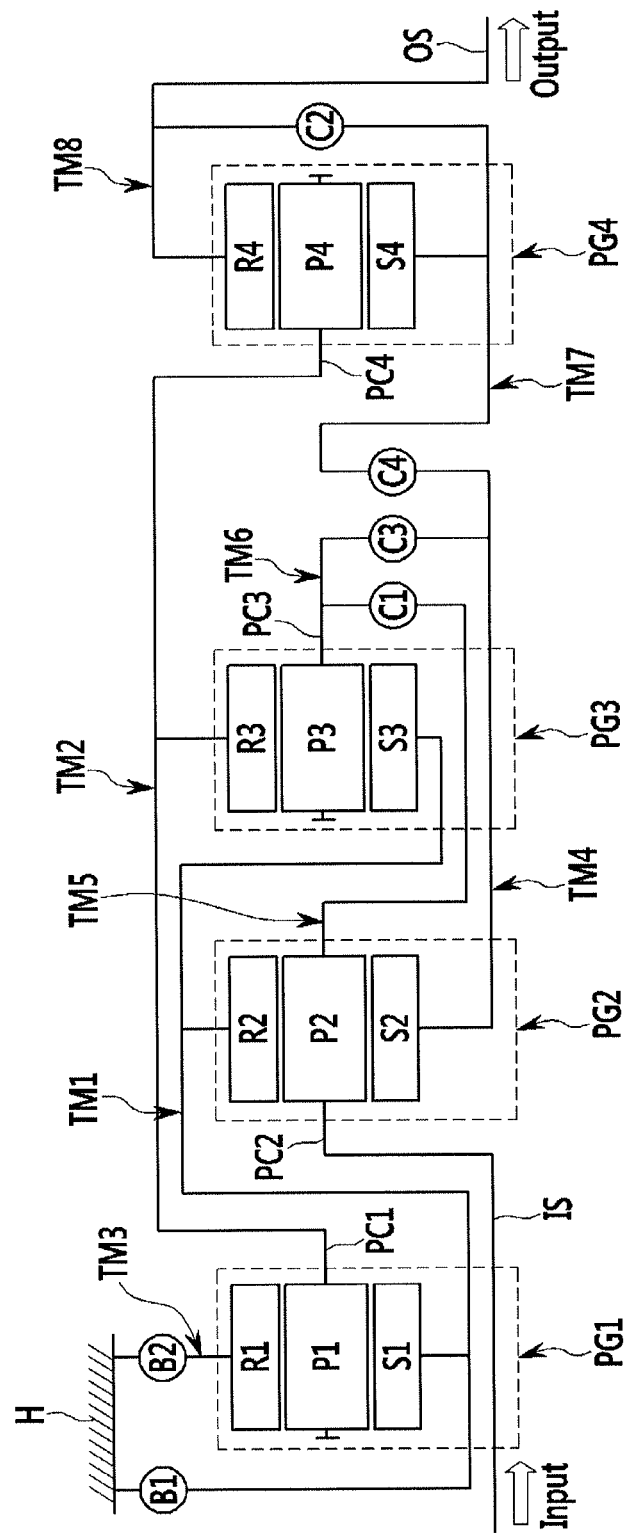
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, eight rotation shafts TM1 to TM8 including at least one of rotation elements of the first, second, third, and fourth planetary gear sets PG1, PG2, PG3, and PG4, six friction elements C1 to C4 and B1 to B2, and a transmission housing H.

As a result, torque input from the input shaft IS is changed by cooperation of the first, second, third, and fourth planetary gear sets PG1, PG2, PG3, and PG4, and the changed torque is output through the output shaft OS.

The simple planetary gear sets are disposed in a sequence of the first, second, third, and fourth planetary gear sets PG1, PG2, PG3, and PG4 from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 as rotation elements thereof.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 as rotation elements thereof.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 as rotation elements thereof The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 as rotation elements thereof.

In the first, second, third, and fourth planetary gear sets PG1, PG2, PG3, and PG4, one or more rotation elements are directly connected to each other to operate with eight rotation shafts TM1 to TM8.

The eight rotation shafts TM1 to TM8 will be described in further detail.

The first rotation shaft TM1 includes the first sun gear S1, the second ring gear R2, and the third sun gear S3, and is selectively connected to the transmission housing.

The second rotation shaft TM2 includes the first planet carrier PC1, the third ring gear R3, and the fourth planet carrier PC4.

The third rotation shaft TM3 includes the first ring gear R1 and is selectively connected to the transmission housing H.

The fourth rotation shaft TM4 includes the second sun gear S2.

The fifth rotation shaft TM5 includes the second planet carrier PC2 and is directly connected to the input shaft IS so as to be continuously operated as an input element.

The sixth rotation shaft TM6 includes the third planet carrier PC3 and is selectively connected to the fourth rotation shaft TM4 or the fifth rotation shaft TM5.

The seventh rotation shaft TM7 includes the fourth sun gear S4 and is selectively connected to the fourth rotation shaft TM4.

The eighth rotation shaft TM8 includes the fourth ring gear R4, is directly connected to the output shaft OS, and is selectively connected to the seventh rotation shaft TM7.

In addition, four clutches C1, C2, C3, and C4 which are friction elements are disposed at connection portions between the input shaft IS and any one rotation shaft or between any two rotation shafts.

In addition, two brakes B1 and B2 which are friction elements are disposed at connection portions between any one rotation shaft and the transmission housing H.

The six frictional elements C1 to C4 and B1 to B2 will be described in further detail.

The first clutch C1 is interposed between the fifth rotation shaft TM5 and the sixth rotation shaft TM6 and selectively connects the fifth rotation shaft TM5 with the sixth rotation shaft TM6.

The second clutch C2 is interposed between the seventh rotation shaft TM7 and the eighth rotation shaft TM8 and selectively connects the seventh rotation shaft TM7 with the eighth rotation shaft TM8.

The third clutch C3 is interposed between the fourth rotation shaft TM4 and the sixth rotation shaft TM6 and selectively connects the fourth rotation shaft TM4 with the sixth rotation shaft TM6.

The fourth clutch C4 is interposed between the fourth rotation shaft TM4 and the seventh rotation shaft TM7 and selectively connects the fourth rotation shaft TM4 with the seventh rotation shaft TM7.

The first brake B1 is interposed between the first rotation shaft TM1 and the transmission housing H and causes the first rotation shaft TM1 to be operated as a selective fixed element.

The second brake B2 is interposed between the third rotation shaft TM3 and the transmission housing H and causes the third rotation shaft TM3 to be operated as a selective fixed element.

The friction elements including the first, second, third, and fourth clutches C1, C2, C3, and C4 and the first and second brakes B1 and B2 may be multi-plates friction elements of wet type that are operated by hydraulic pressure.

FIG. 2 is an operation chart of friction elements at each speed in the planetary gear train according to various embodiments of the present invention.

As shown in FIG. 2, three friction elements are operated at each speed stage in the planetary gear train according to various embodiments of the present invention.

The third and fourth clutches C3 and C4 and the second brake B2 are operated at a first forward speed stage 1ST.

The second and third clutches C2 and C3 and the second brake B2 are operated at a second forward speed stage 2ND.

The second and fourth clutches C2 and C4 and the second brake B2 are operated as a third forward speed stage 3RD.

The first and second clutches C1 and C2 and the second brake B2 are operated at a fourth forward speed stage 4TH.

The first and fourth clutches C1 and C4 and the second brake B2 are operated as a fifth forward speed stage 5TH.

The first, second, and fourth clutches C1, C2, and C4 are operated at a sixth forward speed stage 6TH.

The first and fourth clutches C1 and C4 and the first brake B1 are operated at a seventh forward speed stage 7TH.

The first and second clutches C1 and C2 and the first brake B1 are operated at an eighth forward speed stage 8TH.

The second and fourth clutches C2 and C4 and the first brake B1 are operated at a ninth forward speed stage 9TH.

The second and third clutches C2 and C3 and the first brake B1 are operated at a tenth forward speed stage 10TH.

The third and fourth clutches C3 and C4 and the first brake B1 are operated at an eleventh forward speed stage 11TH.

The fourth clutch C4 and the first and second brakes B1 and B2 are operated at a reverse speed stage REV.

The shifting processes will be described in further detail.

The third and fourth clutches C3 and C4 and the second brake B2 are operated at the first forward speed stage 1ST. The third rotation shaft TM3 is connected to the sixth and seventh rotation shafts TM6 and TM7 by operation of the third and fourth clutches C3 and C4, a rotation speed of the input shaft IS is input to the fifth rotation shaft TM5, and the third rotation shaft TM3 is operated as the fixed element by operation of the second brake B2. Therefore, the first forward speed stage is achieved.

The second and third clutches C2 and C3 and the second brake B2 are operated at the second forward speed stage 2ND. In a state that the fourth rotation shaft TM4 is connected to the sixth rotation shaft TM6 by operation of the third clutch C3 and the seventh rotation shaft TM7 is connected to the eighth rotation shaft TM8 by operation of the second clutch C2, the rotation speed of the input shaft IS is input to the fifth rotation shaft TM5 and the third rotation shaft TM3 is operated as the fixed element by operation of the second brake B2. Therefore, the second forward speed stage is achieved.

The second and fourth clutches C2 and C4 and the second brake B2 are operated at the third forward speed stage 3RD. In a state that the fourth rotation shaft TM4 is connected to the seventh rotation shaft TM7 by operation of the fourth clutch C4 and the seventh rotation shaft TM7 is connected to the eighth rotation shaft TM8 by operation of the second clutch C2, the rotation speed of the input shaft IS is input to the fifth rotation shaft TM5 and the third rotation shaft TM3 is operated as the fixed element by operation of the second brake B2. Therefore, the third forward speed stage is achieved.

The first and second clutches C1 and C2 and the second brake B2 are operated at the fourth forward speed stage 4TH. In a state that the fifth rotation shaft TM5 is connected to the sixth rotation shaft TM6 by operation of the first clutch C1 and the seventh rotation shaft TM7 is connected to the eighth rotation shaft TM8 by operation of the second clutch C2, the rotation speed of the input shaft IS is input to the fifth rotation shaft TM5 and the third rotation shaft TM3 is operated as the fixed element by operation of the second brake B2. Therefore, the fourth forward speed stage is achieved.

The first and fourth clutches C1 and C4 and the second brake B2 are operated at the fifth forward speed stage 5TH. In a state that the fifth rotation shaft TM5 is connected to the sixth rotation shaft TM6 by operation of the first clutch C1 and the fourth rotation shaft TM4 is connected to the seventh rotation shaft TM7 by operation of the fourth clutch C4, the rotation speed of the input shaft IS is input to the fifth rotation shaft TM5 and the third rotation shaft TM3 is operated as the fixed element by operation of the second brake B2. Therefore, the fifth forward speed stage is achieved.

The first, second, and fourth clutches C1, C2, and C4 are operated at the sixth forward speed stage 6TH. In a state that the fifth rotation shaft TM5 is connected to the sixth rotation shaft TM6 by operation of the first clutch C1, the seventh rotation shaft TM7 is connected to the eighth rotation shaft TM8 by operation of the second clutch C2, and the fourth rotation shaft TM4 is connected to the fourth rotation shaft TM4 by operation of the fourth clutch C4, the rotation speed of the input shaft IS is input to the fifth rotation shaft TM5. Therefore, all of the first, second, third, and fourth planetary gear sets PG1, PG2, PG3, and PG4 become direct-coupling states, and the sixth forward speed stage where the rotation speed of the input shaft IS is just output is achieved.

The first and fourth clutches C1 and C4 and the first brake B1 are operated at the seventh forward speed stage 7TH. In a state that the fifth rotation shaft TM5 is connected to the sixth rotation shaft TM6 by operation of the first clutch C1 and the fourth rotation shaft TM4 is connected to the seventh rotation shaft TM7 by operation of the fourth clutch C4, the rotation speed of the input shaft IS is input to the fifth rotation shaft TM5 and the first rotation shaft TM1 is operated as the fixed element by operation of the first brake B1. Therefore, the seventh forward speed stage is achieved.

The first and second clutches C1 and C2 and the first brake B1 are operated at the eighth forward speed stage 8TH. In a state that the fifth rotation shaft TM5 is connected to the sixth rotation shaft TM6 by operation of the first clutch C1 and the seventh rotation shaft TM7 is connected to the eighth rotation shaft TM8 by operation of the second clutch C2, the rotation speed of the input shaft IS is input to the fifth rotation shaft TM5 and the first rotation shaft TM1 is operated as the fixed element by operation of the first brake B1. Therefore, the eighth forward speed stage is achieved.

The second and fourth clutches C2 and C4 and the first brake B1 are operated at the ninth forward speed stage 9TH. In a state that the fourth rotation shaft TM4 is connected to the seventh rotation shaft TM7 by operation of the fourth clutch C4 and the seventh rotation shaft TM7 is connected to the eighth rotation shaft TM8 by operation of the second clutch C2, the rotation speed of the input shaft IS is input to the fifth rotation shaft TM5 and the first rotation shaft TM1 is operated as the fixed element by operation of the first brake B1. Therefore, the ninth forward speed stage is achieved.

The second and third clutches C2 and C3 and the first brake B1 are operated at the tenth forward speed stage 10TH. In a state that the fourth rotation shaft TM4 is connected to the sixth rotation shaft TM6 by operation of the third clutch C3 and the seventh rotation shaft TM7 is connected to the eighth rotation shaft TM8 by operation of the second clutch C2, the rotation speed of the input shaft IS is input to the fifth rotation shaft TM5 and the first rotation shaft TM1 is operated as the fixed element by operation of the first brake B1. Therefore, the tenth forward speed stage is achieved.

The third and fourth clutches C3 and C4 and the first brake B1 are operated at the eleventh forward speed stage 11TH. In a state that the fourth rotation shaft TM4 is connected to the sixth rotation shaft TM6 and the seventh rotation shaft TM7 by operation of the third and fourth clutches C3 and C4, the rotation speed of the input shaft IS is input to the fifth rotation shaft TM5 and the first rotation shaft TM1 is operated as the fixed element by operation of the first brake B1. Therefore, the eleventh forward speed stage is achieved.

The fourth clutch C4 and the first and second brakes B1 and B2 are operated at the reverse speed stage REV. In a state that the fourth rotation shaft TM4 is connected to the seventh rotation shaft TM7 by operation of the fourth clutch C4, the rotation speed of the input shaft IS is input to the fifth rotation shaft TM5 and the first rotation shaft TM1 and the third rotation shaft TM3 are operated as the fixed elements by operation of the first brake B1 and the second brake B2. Therefore, the reverse speed stage is achieved.

The planetary gear train according to various embodiments of the present invention may achieve eleven forward speed stages and one reverse speed stage by control of four planetary gear sets PG1, PG2, PG3, and PG4, four clutches C1, C2, C3, and C4, and two brakes B1 and B2.

Therefore, power delivery performance and fuel economy may be improved.

Since a speed stage suitable to engine speed can be achieved due to multiple speed stages, silent driving may be improved.

In addition, since three friction elements operate at each speed and the number of non-operating friction elements is minimized, a friction drag loss is decreased. Therefore, drag torque and power loss may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque;
   a first planetary gear set including a first sun gear, a first planet carrier, and a first ring gear;
   a second planetary gear set including a second sun gear, a second planet carrier, and a second ring gear;
   a third planetary gear set including a third sun gear, a third planet carrier, and a third ring gear;
   a fourth planetary gear set including a fourth sun gear, a fourth planet carrier, and a fourth ring gear;

a first rotation shaft including the first sun gear, the second ring gear, and the third sun gear, and selectively connected to a transmission housing;
a second rotation shaft including the first planet carrier, the third ring gear, and the fourth planet carrier;
a third rotation shaft including the first ring gear and selectively connected to the transmission housing;
a fourth rotation shaft including the second sun gear;
a fifth rotation shaft including the second planet carrier and directly connected to the input shaft;
a sixth rotation shaft including the third planet carrier and selectively connected to the fourth rotation shaft or the fifth rotation shaft;
a seventh rotation shaft including the fourth sun gear and selectively connected to the fourth rotation shaft; and
an eighth rotation shaft including the fourth ring gear, directly connected to the output shaft, and selectively connected to the seventh rotation shaft.

2. The planetary gear train of claim 1, wherein each of the first, second, third, and fourth planetary gear sets comprises a single pinion planetary gear set.

3. The planetary gear train of claim 1, wherein the first, second, third, and fourth planetary gear sets are disposed sequentially from an engine side.

4. The planetary gear train of claim 1, further comprising:
a first clutch interposed between the fifth rotation shaft and the sixth rotation shaft;
a second clutch interposed between the seventh rotation shaft and the eighth rotation shaft;
a third clutch interposed between the fourth rotation shaft and the sixth rotation shaft;
a fourth clutch interposed between the fourth rotation shaft and the seventh rotation shaft;
a first brake interposed between the first rotation shaft and the transmission housing; and
a second brake interposed between the third rotation shaft and the transmission housing.

5. The planetary gear train of claim 4, wherein a first forward speed stage is achieved by operation of the third and fourth clutches and the second brake,
a second forward speed stage is achieved by operation of the second and third clutches and the second brake,
a third forward speed stage is achieved by operation of the second and fourth clutches and the second brake,
a fourth forward speed stage is achieved by operation of the first and second clutches and the second brake,
a fifth forward speed stage is achieved by operation of the first and fourth clutches and the second brake,
a sixth forward speed stage is achieved by operation of the first, second, and fourth clutches,
a seventh forward speed stage is achieved by operation of the first and fourth clutches and the first brake,
an eighth forward speed stage is achieved by operation of the first and second clutches and the first brake,
a ninth forward speed stage is achieved by operation of the second and fourth clutches and the first brake,
a tenth forward speed stage is achieved by operation of the second and third clutches and the first brake,
an eleventh forward speed stage is achieved by operation of the third and fourth clutches and the first brake, and
a reverse speed stage is achieved by operation of the fourth clutch and the first and second brakes.

6. A planetary gear train of an automatic transmission for a vehicle, comprising:
an input shaft receiving torque of an engine;
an output shaft outputting changed torque;
a first planetary gear set including a first sun gear, a first planet carrier, and a first ring gear;
a second planetary gear set including a second sun gear, a second planet carrier, and a second ring gear;
a third planetary gear set including a third sun gear, a third planet carrier, and a third ring gear; and
a fourth planetary gear set including a fourth sun gear, a fourth planet carrier, and a fourth ring gear,
wherein the input shaft is directly connected to the second planet carrier,
the output shaft is directly connected to the fourth ring gear,
the first sun gear is directly connected to the second ring gear and the third sun gear,
the first planet carrier, the third ring gear, and the fourth planet carrier are directly connected to each other,
the second planet carrier is selectively connected to the third planet carrier,
the fourth sun gear is selectively connected to the fourth ring gear,
the second sun gear is selectively connected to the third planet carrier,
the second sun gear is selectively connected to the fourth sun gear,
the first sun gear is selectively connected to a transmission housing, and
the first ring gear is selectively connected to the transmission housing.

7. The planetary gear train of claim 6, wherein each of the first, second, third, and fourth planetary gear sets comprises a single pinion planetary gear set.

8. The planetary gear train of claim 6, wherein the first, second, third, and fourth planetary gear sets are disposed sequentially from an engine side.

9. The planetary gear train of claim 6, further comprising:
a first clutch connecting the second planet carrier with the third planet carrier;
a second clutch connecting the fourth sun gear with the fourth ring gear;
a third clutch connecting the second sun gear with the third planet carrier;
a fourth clutch connecting the second sun gear with the fourth sun gear;
a first brake connecting the first sun gear with the transmission housing; and
a second brake connecting the first ring gear with the transmission housing.

10. The planetary gear train of claim 9, wherein a first forward speed stage is achieved by operation of the third and fourth clutches and the second brake,
a second forward speed stage is achieved by operation of the second and third clutches and the second brake,
a third forward speed stage is achieved by operation of the second and fourth clutches and the second brake,
a fourth forward speed stage is achieved by operation of the first and second clutches and the second brake,
a fifth forward speed stage is achieved by operation of the first and fourth clutches and the second brake,
a sixth forward speed stage is achieved by operation of the first, second, and fourth clutches,
a seventh forward speed stage is achieved by operation of the first and fourth clutches and the first brake,
an eighth forward speed stage is achieved by operation of the first and second clutches and the first brake,
a ninth forward speed stage is achieved by operation of the second and fourth clutches and the first brake, a tenth forward speed stage is achieved by operation of the second and third clutches and the first brake,
an eleventh forward speed stage is achieved by operation of the third and fourth clutches and the first brake, and
a reverse speed stage is achieved by operation of the fourth clutch and the first and second brakes.

\* \* \* \* \*